UNITED STATES PATENT OFFICE.

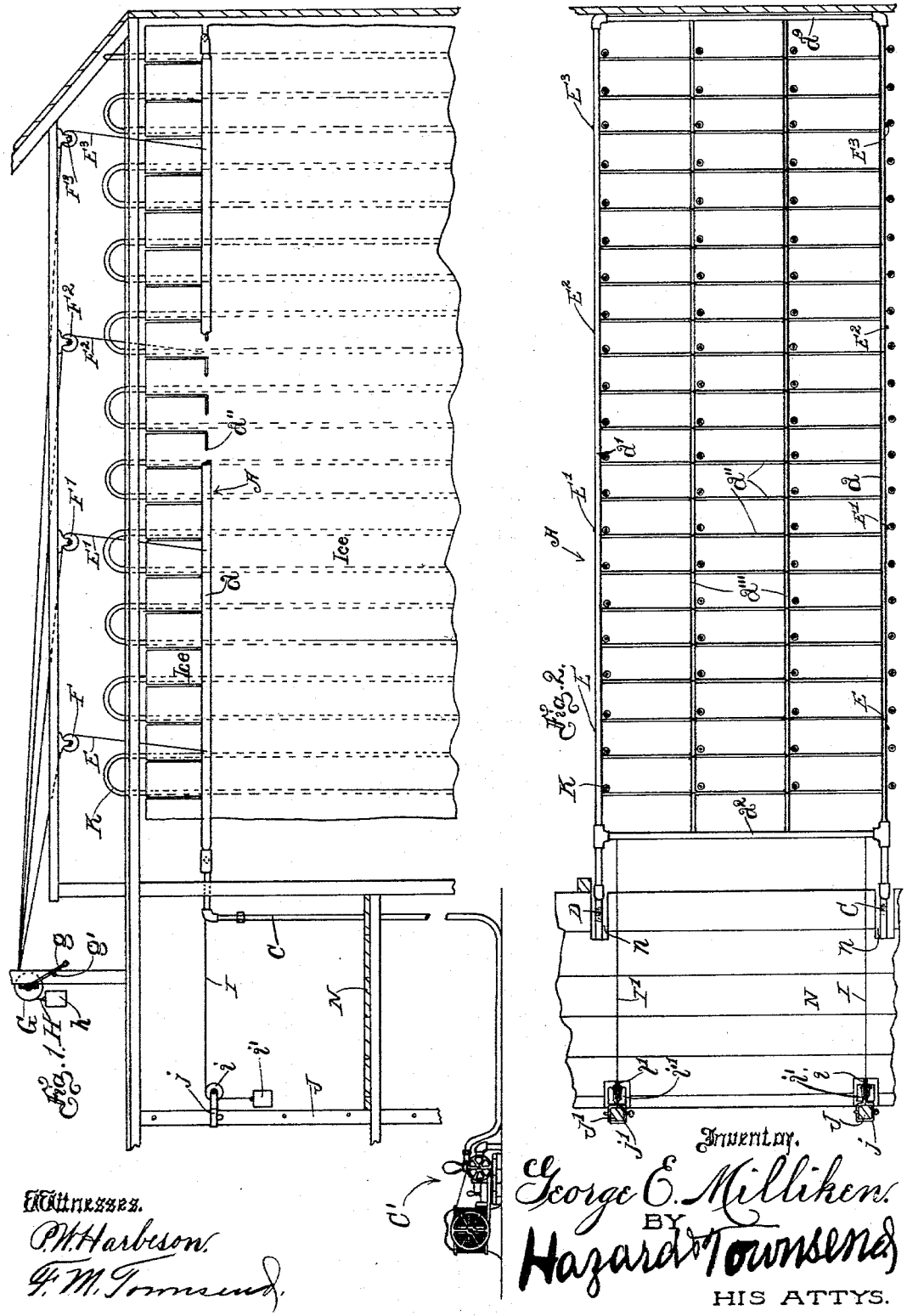

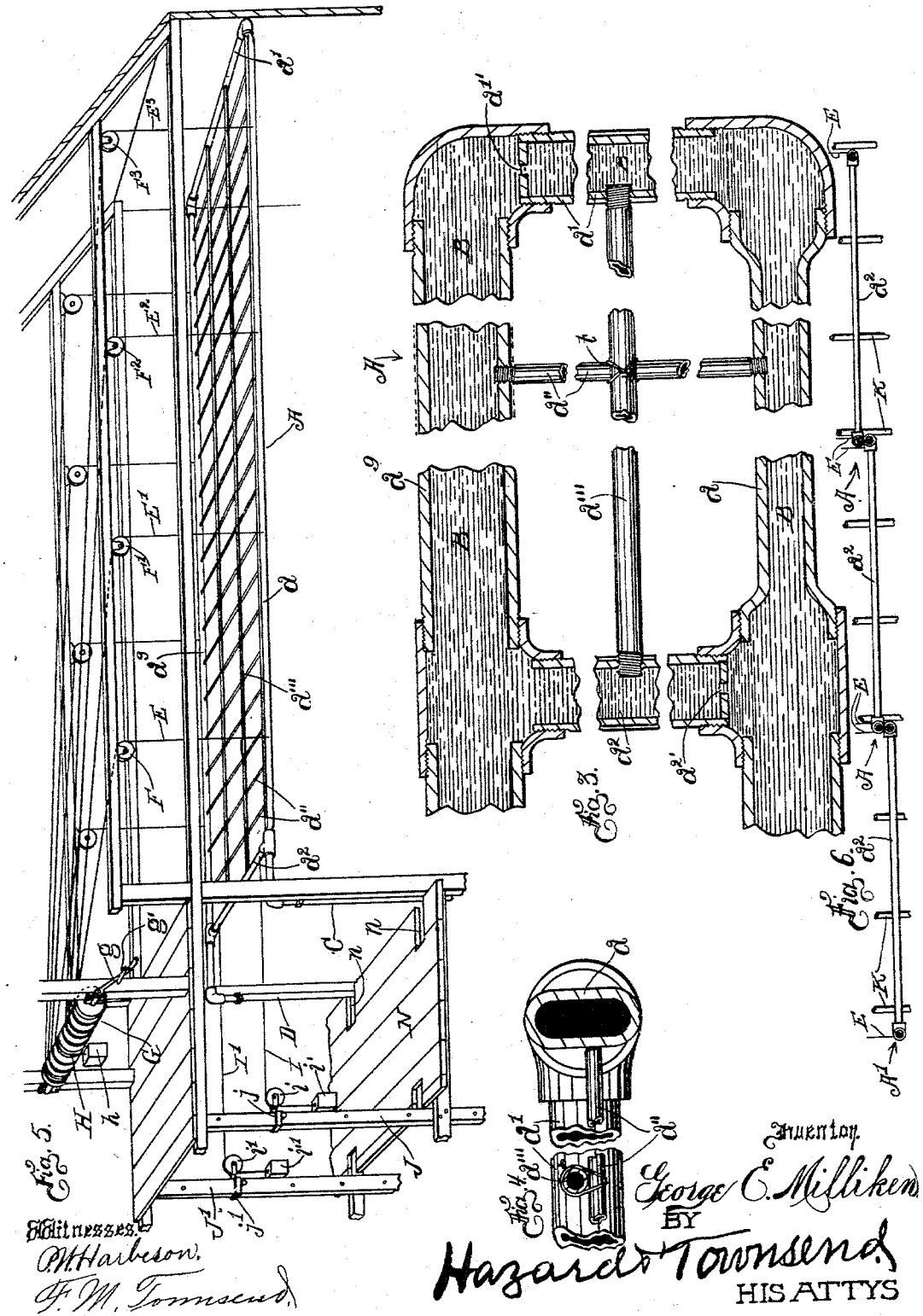

GEORGE E. MILLIKEN, OF MENTONE, CALIFORNIA.

ICE-CUTTING MACHINE.

SPECIFICATION forming part of Letters Patent No. 546,283, dated September 10, 1895.

Application filed February 11, 1895. Serial No. 537,863. (No model.)

*To all whom it may concern:*

Be it known that I, GEORGE E. MILLIKEN, a citizen of the United States, residing at Mentone, in the county of San Bernardino and State of California, have invented new and useful Improvements in Processes of and Machines for Cutting Ice, of which the following is a specification.

The object of my invention is to provide for economically and conveniently cutting large bodies of ice into blocks suitable for handling.

My invention in its amplified form is specially adapted for use in those ice-factories using spraying-machines in which the ice is frozen into one large solid block by means of freezing-pipes which are arranged vertically in the freezing-room of the factory.

The difficulties to be overcome in cutting large bodies of ice into blocks suitable for handling have heretofore been very great, and I have heretofore attempted to accomplish the work by means of heated wires and by various other means; but the great capacity of the ice for suddenly absorbing heat has effectually prevented the successful use of such wires electrically or otherwise heated, so far as I have been able to adapt the same for the purpose.

I am not at present aware of any successful way in which to remove the ice from the class of ice-machines above mentioned excepting to quarry the same, and in my experience the cost of quarrying the ice from such machine has amounted to about one dollar per ton.

By my present invention I am enabled to cut the ice into suitable blocks at a mere nominal expense.

My invention relates to that form of ice-cutter comprising a movable tubular manifold, a stream of suitable fluid flowing through such manifold, and means for moving the manifold.

It comprises an ice-cutter having a movable tubular manifold consisting of feed and discharge pipes arranged substantially in one plane and cross-cutting tubes connecting between the feed and discharge pipes, and all arranged substantially in one plane with such pipes. Said manifold is arranged to move vertically and also in the plane of such tubes, and suitable means are provided for stopping and sustaining the manifold on different planes, so that the manifold can be made to cut both vertically and horizontally in different planes, thus to successively cut the large body of ice into layers of blocks.

It also comprises parts and combinations of mechanism by which I adapt the same for practically and economically cutting large bodies of ice.

My invention enables me to more economically cut into small blocks the large bodies of ice which are frozen in factories by such spraying-machines. It is notably distinguished from all other machines by its great capacity and extreme convenience for cutting ice into numerous blocks, this being done by successive vertical and horizontal movements of the manifold.

My invention embodies various features, parts, and combinations of parts, which I will now more particularly describe.

The accompanying drawings illustrate my invention.

Figure 1 is a fragmental side elevation showing my ice-cutting apparatus in operation cutting ice in a freezing-room of an ice-factory. A pump for forcing the fluid through the tube is also shown. In this view the machine is represented as having made the topmost horizontal cut and one vertical cut and part of the second horizontal cut, so that the upper layer of blocks is partially detached from the main body of ice. Fig. 2 is a plan showing the heat-conducting tubular manifold through which the fluid is passed in carrying out my invention in its most complete form. In this view the manifold is shown in its normal position with relation to the freezing-pipes. Other parts of the machine are also shown. Fig. 3 is a fragmental horizontal sectional detail of the tubular manifold, illustrating the interior of the same. Fig. 4 is a cross-section of the main limb $a$ of the feed-pipe. Fragments of other parts are shown. Fig. 5 is a fragmental perspective view showing my invention as applied to the freezing-room of an ice-factory, the lower portion of the freezing-room being broken away. A fragmental view external to the lower part of the freezing-room is also given to show suitable means for forcing the fluid through the tubes. In this view the freezing-pipes are omitted to avoid confusion. Fig. 6 is a fragmental front end view showing the arrangement of manifolds in a large machine just before cutting.

A indicates a tubular manifold comprising the feed-pipe, having two limbs or members $a$ and $a^9$ extending along and forming two sides of the frame of the manifold, the discharge-pipe $a'$ $a^2$ extending along and forming the other two sides of the frame of the manifold and communicating at its ends with the feed-pipe through contracted ports $a^{1\prime}$ $a^{2\prime}$. Cross-cutting tubes $a''$ connecting between one limb $a$ of the feed-pipe and one limb $a'$ of the discharge-pipe, and cross-cutting tubes $a'''$ communicating between the other limb $a^9$ of the feed-pipe and the other limb $a^2$ of the discharge-pipe. The several pipes or tubes which form this manifold are made of metal and are heat-conducting.

B indicates a suitable fluid flowing through the tubular manifold to carry sufficient heat to melt a passage for the tube containing it.

C indicates a flexible inlet-hose for introducing water or other suitable fluid substance into the main limb $a$ of the feed-pipe.

C' indicates a pump connected with such hose and constitutes suitable means for forcing the fluid through the tubes.

D indicates the discharge-hose leading from the discharge-pipe.

The tubular manifold is movable and the machine in its preferred form is provided with suitable means, hereinafter described, for moving the manifold vertically and means for moving it horizontally. The manifold is suspended by suitable suspending-cords E E' E², &c., which are fastened to the manifold and passed therefrom to and over the suspending-pulleys F F' F², &c., respectively, and are then wound around and fastened to an axle G, so that the rotation of the axle in one direction will raise the manifold and in the other direction will lower it. $g$ is a crank by which the axle may be rotated, and $g'$ is a pin, which in practice is inserted in the path of the crank, so as to allow only one complete rotation of the axle without stopping. I provide means for retarding the rotation of the axle against the force exerted by the downward movement of the manifold. This is designed to serve as a tension device to hold the axle against too free rotation, so that the suspending-cords will remain taut. This consists of a cord H, attached to the axle and arranged depending therefrom and provided with a weight $h$. The cord H is detachably connected with the axle G, so that it may be applied to the axle to operate against the downward movement of the manifold during the descent of the same through one rotation of the axle and then be detached by the operator until the horizontal cut has been made, and to then be readjusted by raising the weight and again fastening the cord to the axle, so that when the pin $g'$ is removed from the path of the crank $g$ to allow the crank to pass the axle may again make one rotation before the counterbalancing-weight $h$ will reach the limit of its upward movement.

I provide means for swinging the manifold horizontally to make the horizontal cut, and these means, as shown, consist of cords I I', &c., fastened to such manifold and led therefrom laterally on one side over suitable pulleys $i$ $i'$, &c., respectively, and suitable weights $i'$ $i^{11}$, &c., attached, respectively, to such cords. The means for moving the manifold sidewise horizontally are adjustable as to height, so that they can be placed in suitable position for moving the manifold horizontally at the different levels at which the horizontal cuts are to be made. For this purpose the pulleys $i$, &c., are adjustably attached to vertical posts or guides J J', &c. The adjustable attachment of these pulleys to the posts or guides may be made by any device suitable for that purpose. $j$ indicates such device.

By the means above described the manifold is adapted to swing and to be lowered and stopped successively at stated points, so that a succession of vertical and horizontal cuts can be made with the manifold.

I will now describe the practical operation of my invention where the same is used in an ice-machine of the character above mentioned, and its operation in other situations will be readily understood without further description. In such a machine the swing manifold is arranged in the freezing-room with the ammonia or freezing-pipes K, respectively, in one corner of the rectangles formed by the cross-cutting tubes $a''$ and $a'''$ and manifold-frame. This is preferably the normal position of the manifold with relation to the freezing-pipes, and the means for moving the manifold laterally are applied so that when they are allowed to operate they will draw the manifold the full width or length, as the case may be, of one of the rectangular spaces between the cross-cutting tubes before the ammonia-pipes will interfere with the lateral movement of the manifold.

Before the process of freezing in the freezing-room is commenced the manifold is entirely emptied of any fluid which might congeal in the temperature to which the freezing-room is subjected during the process of freezing. If water is the fluid used, this can be easily done by tilting the manifold with the inlet-port uppermost and the supply of fluid shut off, and thus causing the water or other liquid in the manifold to flow to and out through the discharge-hose. When this has been fully accomplished, the manifold is raised to the top of the freezing-room by rotating the axle G by means of the crank $g$ and fastening the same in position by means of the pin $g'$ being placed in the path of the crank. Then the process of freezing is conducted until the freezing-room is filled with a solid block of ice. Then to cut the ice into blocks water or some other fluid such as air or any other suitable fluid which will conduct heat into the tubes sufficiently for the purpose, is forced through the tubes to melt the ice, which contacts immediately with the tubes. The means for swinging the manifold laterally are then applied to the manifold, and the manifold is thereby caused to make one complete horizontal cut across the space between the rows of freezing-pipes, the tubes melting their paths through the ice. This cut is made with greater or less rapidity, depending upon the amount of heat applied through the fluid which flows through the tubes. It has been my practice to use water at an ordinary temperature, and in the summertime, when the water exposed to the sun and outside atmosphere is much warmer than the ice, the cutting is conducted more rapidly than when the water is colder. I deem it desirable to use a fluid of not too high a temperature. For example, I suppose that steam or any highly-heated fluid would be more or less objectionable, owing to the liability that it would melt ice with which the pipes were not in contact; but I have not experimented along that line and I wish my claim to cover the use of any fluid which may be found to serve the purpose.

When the first horizontal cut has been made, the means for moving the manifold horizontally are detached or otherwise adjusted so that they will not operate to deflect the manifold from a vertical course while the next cut is being made. The manifold is then pushed back to its normal or initial position, (shown in Figs. 2 and 4,) and the pin $g'$ is removed from the path of the crank. The crank is passed beyond the pin and the pin is again inserted so as to intercept the crank when one complete revolution has been made. The means for retarding the rotation of the axle are then adjusted to accomplish that purpose, and the machine is then left to operate until one complete revolution of the axle has been accomplished by the downward movement of the manifold, under the force of gravity cutting its way through the ice as rapidly as the fluid causes the tubes to melt their paths therethrough.

When the manifold has completed its descent through the space allowed by the one rotation of the axle, the blocks are then free on five sides and could be easily detached from the main block or body of ice, but I cut it therefrom by swinging the manifold laterally. For this purpose the means for swinging it laterally are adjusted to the proper height and attached to the manifold and thrown into operation.

In the drawings the pipes have been exaggerated for clearness. I find in practice that the cross-cutting tubes $a''$ may be one-eighth-inch pipe and the ports between the feed and discharge pipes be one-eighth inch in diameter. The cross-cutting tubes $a'''$ should be one-fourth-inch pipe, the main limb $a$ of the feed-pipe and the main limb $a'$ of the discharge-pipe should be one-inch pipe, and the other limbs $a^9$ and $a^2$ of the feed and discharge pipes should be three-fourths-inch pipe. The cross-cutting tubes are right and left screw-threaded at their ends, and are screwed into the feed and discharge pipes at proper intervals apart. I prefer to make the blocks twenty-four inches deep or thick by sixteen inches wide and forty inches long, and I prefer to move the manifold across the block in making the horizontal cut. It is not necessary that the manifold should move the full extent of one dimension of the block in making the horizontal cut. All that is necessary is that it should approximate such movement sufficiently to serve the purpose of enabling the workmen to readily remove the blocks. In fact, I do not in practice move the manifold horizontally the full width of the block, but I leave enough ice uncut to hold the blocks erect, to allow the free return of the manifold to its normal position. Then when it has cut below the top of the main block the partially-severed blocks can be removed while the cutting of the next larger blocks is progressing. The cross-cutting tubes are bound together with wire or other suitable bands $t$ to keep the rectangles uniform in size.

I prefer to arrange the manifold, as shown, with the length of the spaces between the tubes parallel with the chute-floor N.

I have shown but one chute-floor; but it is understood that there are a number of them for the convenience of the workmen. Passages $n$ may be provided to allow the feed and discharge pipes and the hose therefor to move up and down without the interference of the floor when the manifold is partially or wholly swung to the side. If preferred, one of the planks of the floor may be left loose to be removed while the manifold is passing from one chute to another.

I have shown a pump for forcing the fluid through the tubes; but it is to be understood that I wish to include all equivalents. It would be equivalent, for instance, to elevate the feed-hose and supply it with water at such a height as to cause the water to flow through the tubes by the force of gravity. The water should be forced through under high pressure.

Various forms of apparatus may be substituted for that which I have shown without departing from the spirit of my invention, and I do not wish to limit my claims to the specific construction shown.

The main or inlet limb $a$ of the feed-pipe of the manifold is preferably flattened vertically, so that it will cut easily through the ice vertically. This is practicable with the main limb of the feed-pipe, because it does not have to cut its way horizontally. I do not flatten the cross-cutting tubes, because they are to cut both ways, vertically and horizontally. They should be of as small size as practicable.

I have made it a practice to cut away the ice to leave a path for the limb $a^9$; but the freezing-room and manifold can easily be so constructed and arranged that the ice will not freeze out far enough to intercept that limb of the feed-pipe.

The manifold which I have shown in Figs. 1 to 5 is one arranged for use as an intermediate manifold of a series of manifolds. There is usually to be a number of manifolds in the freezing-room, as shown in Fig. 6, arranged to work successively. The first one of the series would have its discharge-pipe far enough from the ammonia-pipes to be out of contact with the frozen ice, and the main limb of the discharge-pipe of each of the other manifolds would be arranged above the manifold just preceding it and will move down in the space from which the ice has been cut by the preceding manifold.

In Fig. 6, A' is the first one of the series of manifolds.

Now, having described my invention, what I claim as new, and desire to secure by Letters Patent, is—

1. In an ice cutting machine the combination of a series of vertically movable manifolds substantially such as set forth, in which the main limb of the discharge pipe of one manifold is above the main limb of the feed pipe of the manifold which precedes it and means for separately moving the manifolds vertically.

2. An ice cutter comprising a swinging tubular manifold; means for moving the same vertically; means for moving it horizontally; a suitable fluid; and means for forcing the fluid through the manifold.

3. An ice cutter comprising a tubular manifold; suspending pulleys; an axle; suspending cords fastened to the manifold and passed over the suspending pulleys, respectively, and wound around and fastened to the axle; means for stopping the rotation of the axle at a desired point; a suitable fluid; means for forcing such fluid through the manifold; and means for moving the manifold horizontally.

4. An ice cutter comprising a tubular manifold; suspending pulleys; an axle; suspending cords fastened to the manifold and passed over the suspending pulleys, respectively, and wound around and fastened to the axle; means for retarding the rotation of the axle; means for stopping the rotation of the axle at a desired point; a suitable fluid; means for forcing such fluid through the manifold; and means for moving the manifold horizontally.

5. An ice cutter comprising a tubular manifold; suspending pulleys; an axle; suspending cords fastened to the manifold and passed over the suspending pulleys respectively, and wound around and fastened to the axle; a cord fastened to the axle and arranged to be wound thereupon and arranged depending therefrom; a weight fastened to such cord; means for stopping the rotation of the axle at a desired point; a suitable fluid; means for forcing the fluid through the manifold; and means for moving the manifold horizontally.

6. The combination of the manifold; the suspending pulleys; an axle; suspending cords fastened to the manifold and passed over the suspending pulleys respectively and wound around and fastened to the axle; a cord fastened to the axle and arranged to be wound thereupon and arranged depending therefrom; a weight fastened to such cord and means for stopping the rotation of the axle at a desired point.

7. An ice cutting machine comprising a tubular manifold the cutting tubes of which cross each other and are all arranged in substantially one horizontal plane; a suitable fluid; means for forcing the fluid through the manifold; means for moving the manifold vertically; means for sustaining the manifold on different planes successively and means for moving the manifold horizontally.

8. The combination of a tubular manifold suspended so as to swing; a suitable fluid; means for forcing the fluid through such manifold; cords fastened to such manifold and led therefrom laterally on one side to and over suitable pulleys, respectively; such pulleys; and suitable weights attached respectively to such cords.

9. An ice cutting machine comprising a tubular manifold; suspending pulleys; an axle; suspending cords fastened to the manifold and passed over the suspending pulleys respectively, and wound around and fastened to the axle; a cord fastened to the axle and arranged to wind thereupon and arranged depending therefrom; a weight fastened to such cord; means for stopping the rotation of the axle at a desired point; a suitable fluid; means for forcing the fluid through the manifold; cords fastened to the manifold and led therefrom laterally on one side and over suitable pulleys respectively; such pulleys and suitable weights attached respectively to such cords.

10. An ice cutter comprising a tubular manifold containing a flowing fluid; means for suspending such manifold; and means for lowering the manifold and stopping it successively at stated points.

11. An ice cutter comprising a tubular manifold containing a flowing fluid; means for suspending such manifold; and allowing it to swing; means for lowering the manifold and stopping it successively at stated points; and means for swinging the manifold.

12. An ice cutter comprising a tubular manifold containing a flowing fluid; means for suspending such manifold; and allowing it to swing; means for lowering the manifold and stopping it successively at stated points; pulleys adjustable as to height arranged at one side of the manifold; cords fastened to the manifold and led to and over said pulleys, respectively; weights attached to such pulleys respectively, and means for adjusting the pulleys as to height.

13. In an ice cutter the tubular manifold set forth comprising the feed pipe extending along two sides of a parallelogram; the discharge pipe extending along the other two sides of the parallelogram and communicating at its ends with the feed pipe through contracted ports; the cross-cutting tubes connecting between one limb of the feed pipe and one limb of the discharge pipe; and cross-cutting tubes communicating between the other limb of the feed pipe and the other limb of the discharge pipe.

14. In an ice cutter, a movable tubular manifold comprising feed and discharge pipes arranged in substantially one plane and cross cutting tubes connecting between the feed and discharge pipes and all arranged substantially in the same plane with such pipes.

GEO. E. MILLIKEN.

Witnesses:
JAMES R. TOWNSEND,
ALFRED I. TOWNSEND.